No. 812,179. PATENTED FEB. 13, 1906.
C. A. BRINLEY.
WHEEL.
APPLICATION FILED NOV. 23, 1904.
2 SHEETS—SHEET 1.
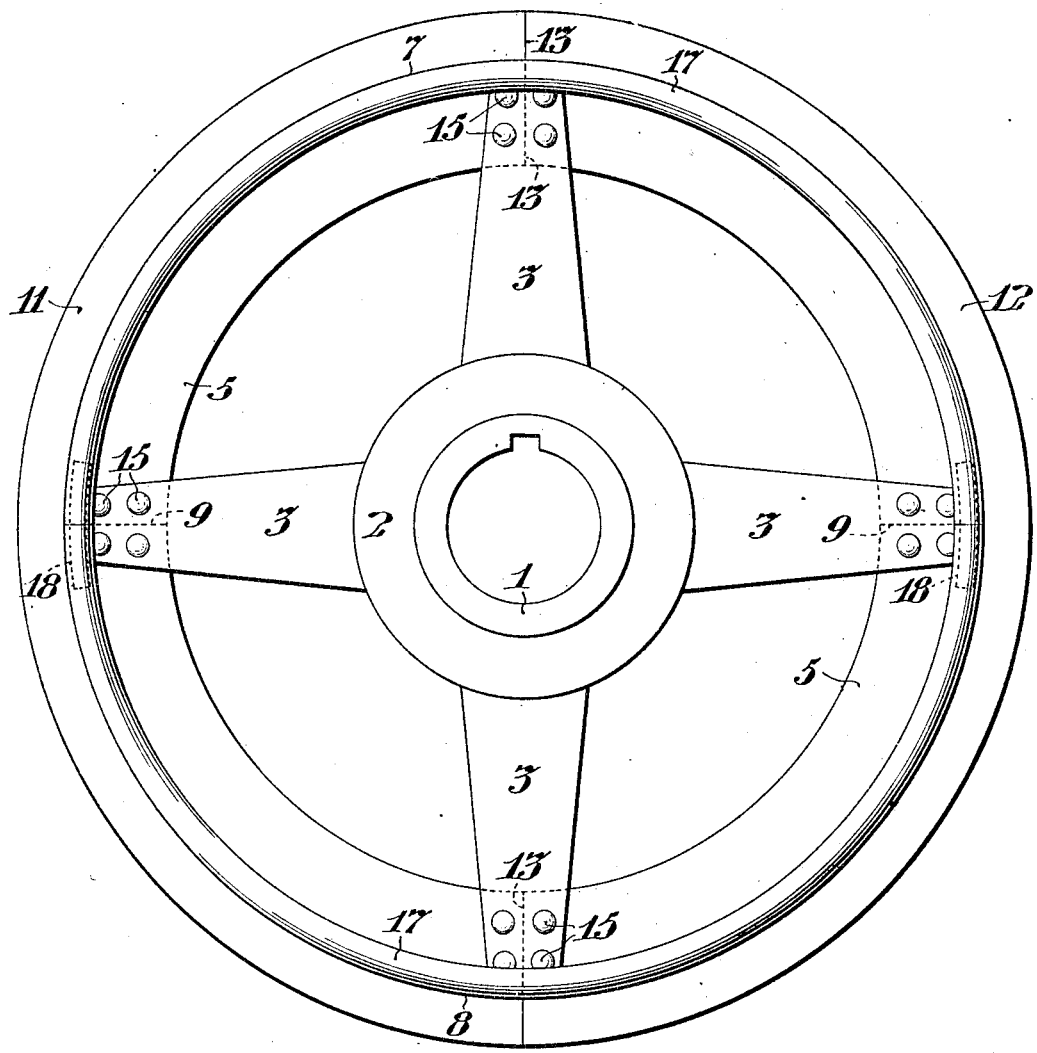
FIG. I.
WITNESSES:
Clifton C. Hallowell
John C. Bergner
INVENTOR:
CHARLES A. BRINLEY,
by Paige, Paul & Foley
Attys.

No. 812,179. PATENTED FEB. 13, 1906.
C. A. BRINLEY.
WHEEL.
APPLICATION FILED NOV. 23, 1904.
2 SHEETS—SHEET 2.
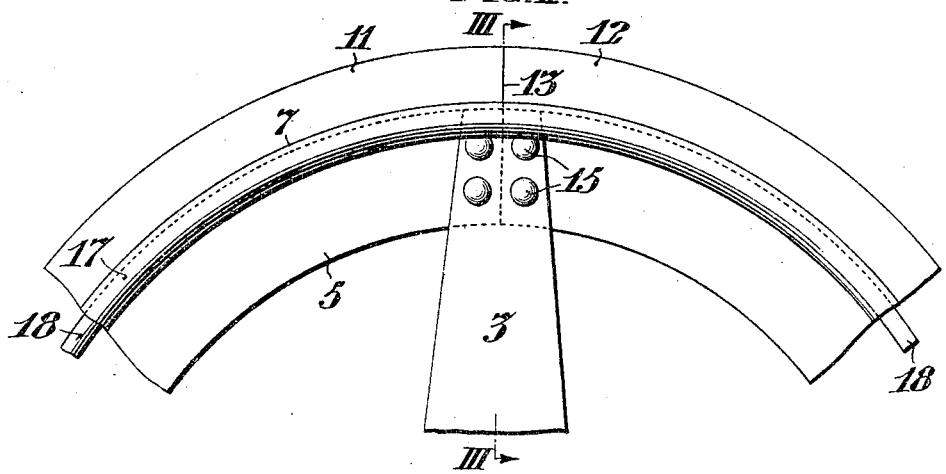
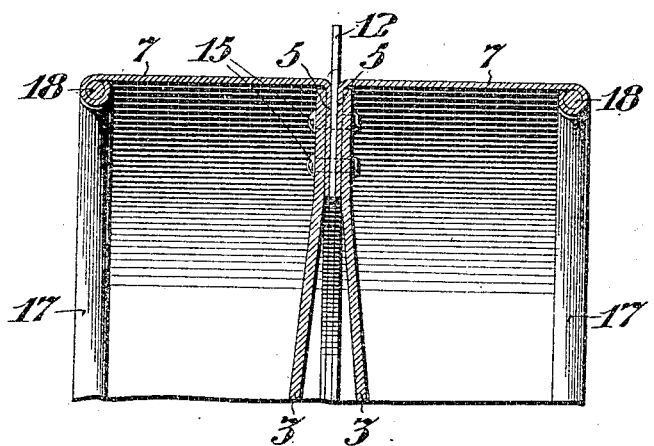
WITNESSES:
Clifton C. Hallowell
John C. Bergner
INVENTOR:
CHARLES A. BRINLEY,
By Paige, Paul & Foley
Attys.

UNITED STATES PATENT OFFICE.

CHARLES A. BRINLEY, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

WHEEL.

No. 812,179.     Specification of Letters Patent.     Patented Feb. 13, 1906.

Application filed November 23, 1904. Serial No. 234,079.

*To all whom it may concern:*

Be it known that I, CHARLES A. BRINLEY, of Philadelphia, in the State of Pennsylvania, have invented certain new and useful Improvements in Wheels, whereof the following is a specification, reference being had to the accompanying drawings.

My improvements are particularly applicable to pulleys constructed wholly of metal; and it is the object of my invention to form such a wheel with a partition-flange projecting intermediate of the width of the belt-surface at less cost of manufacture than heretofore.

The pulley, hereinafter described, comprises a metal hub having flanged disks of pressed sheet metal and spoke members formed of pressed sheet metal secured to said hub-flanges and to inwardly-turned flanges on semicylindric sections of pressed sheet metal forming the wheel-rim. The partition-flange is conveniently made of semicircular sections of sheet metal, which extend between said inwardly-turned rim-flanges and are conveniently secured by the same rivets which secure the spoke members to said flanges.

The construction described is advantageous in that a pulley provided with such a partition-flange may carry two belts extending in opposite directions.

My invention comprises the various novel features of construction and arrangement hereinafter more definitely specified.

In the drawings, Figure I is a side elevation of a pulley conveniently embodying my improvements. Fig. II is a side elevation of a fragment of a wheel conveniently embodying my improvements. Fig. III is a radial sectional view taken on the line III III in Fig. II.

In said figures the hub 1, which may be conveniently formed of cast metal, is provided with annular flanges 2 upon the respectively opposite sides of pairs of spokes 3, and the latter converge outwardly to embrace the inwardly-turned flanges 5 on the axially-alined semicylindrical members forming the respectively opposite rim-sections 7 and 8, which are divided on the diametrical lines 9. (Indicated in Fig. I.) Said flanges 5 embrace the semicircular members 11 and 12 of the partition-flange, which are divided on the diametrical lines 13, as indicated in Fig. I. Said flanged members of the rim-sections 7 and 8 are secured in rigid relation with the members 11 and 12 of the partition-flange by the rivets 15, which extend through the spoke members 3, flanges 5, and said partition-flange members 11 and 12, as indicated in Fig. III. The outer edges of said rim-sections 7 and 8 are conveniently reinforced by inwardly-turned curved flanges 17, which may be hollow or may inclose metal rods 18, the latter being either local to the joints between the sections, as indicated in Fig. I, or extending throughout the circumference of the rim, as indicated in Fig. II.

I claim—

1. In a wheel, the combination with a sheet-metal rim comprising axially-alined members; of a primarily separate partition-flange extending beyond said rim and between said members, and, means extending through said partition-flange and rim, maintaining them in rigid relation, substantially as set forth.

2. In a wheel, the combination with a sheet-metal rim comprising axially-alined members having inwardly-turned flanges; of a primarily separate partition-flange extending beyond said rim and between said flanges, and, means extending through said partition-flange and rim, maintaining them in rigid relation, substantially as set forth.

3. In a wheel, the combination with a sheet-metal rim comprising axially-alined members forming opposed semicylindric sections; of a partition-flange formed of primarily separate semicircular sections extending beyond said rim and between said members, substantially as set forth.

4. In a wheel, the combination with a sheet-metal rim comprising axially-alined members forming opposed semicylindric sections; of a partition-flange formed of semicircular sections extending beyond said rim and between said members; the joints between said rim-sections and said partition-flange sections being in staggered relation; and, means securing said rim-sections and partition-flange sections in rigid relation, substantially as set forth.

5. In a wheel, the combination with a sheet-metal rim comprising axially-alined sectoral members; of a partition-flange comprising sectoral members extending beyond said rim and between its members; and, means securing said members in rigid relation, substantially as set forth.

6. In a wheel, the combination with a sheet-metal rim comprising axially-alined sectoral members; of a partition-flange comprising sectoral members extending beyond said rim and between its members; the joints between said rim members and said flange members being in staggered relation; and, means securing said members in rigid relation, substantially as set forth.

7. In a wheel, the combination with a sheet-metal rim comprising axially-alined sectoral members; of a partition-flange comprising sectoral members extending beyond said rim and between its members; the joints between said rim members and said flange members being in staggered relation; and, means securing said members in rigid relation, comprising spoke members and rivets extending through the same, substantially as set forth.

8. In a wheel, the combination with a sheet-metal rim comprising axially-alined sectoral members having inwardly-turned flanges; of a partition-flange comprising sectoral members extending beyond said rim and between said flanges; the joints between said rim members and said flange members being in staggered relation; and, means securing said members in rigid relation, comprising spoke members and rivets extending through the same, substantially as set forth.

9. In a wheel, the combination with a sheet-metal rim comprising axially-alined sectoral members, having inwardly-turned flanges; of a partition-flange comprising sectoral members extending beyond said rim and between said flanges; spoke members upon opposite sides of said flanges; and, means extending through said spoke members and said flanges, securing the same in rigid relation, substantially as set forth.

In testimony whereof I have hereunto signed my name, at Philadelphia, Pennsylvania, this 22d day of November, 1904.

CHARLES A. BRINLEY.

Witnesses:
 ARTHUR E. PAIGE,
 ANNA F. GETZFREAD.